Dec. 30, 1930. P. SCHOENBERGER 1,786,963
SPRINKLER SYSTEM
Filed Sept. 22, 1926
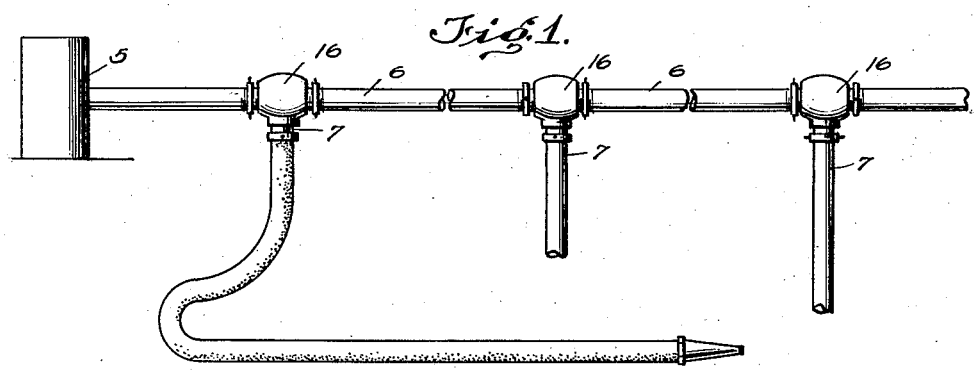
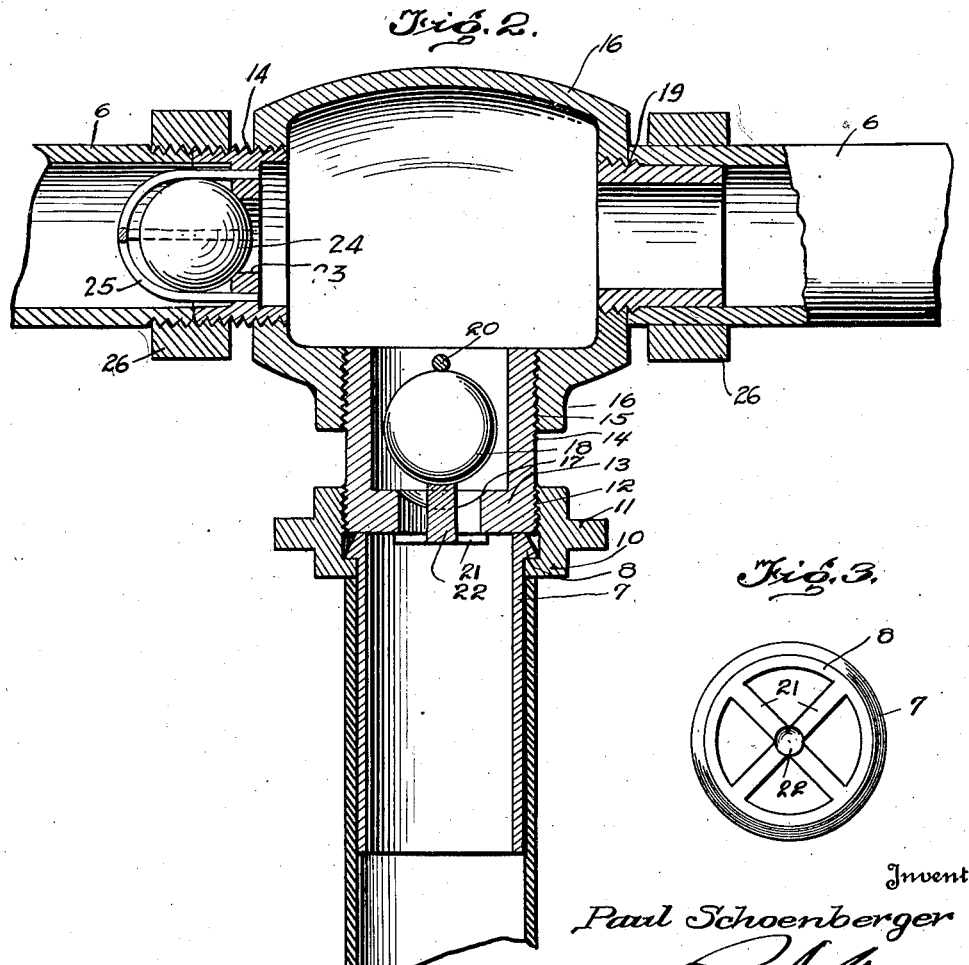
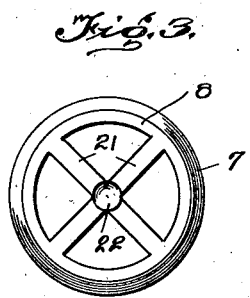
Inventor
Paul Schoenberger
By
Attorney Patented Dec. 30, 1930

1,786,963

UNITED STATES PATENT OFFICE

PAUL SCHOENBERGER, OF BELTON, MONTANA, ASSIGNOR OF ONE-HALF TO CHESTER YALE, OF WHITEFISH, MONTANA

SPRINKLER SYSTEM

Application filed September 22, 1926. Serial No. 137,124.

This invention relates to improvements in sprinkler systems and more particularly to sprinkler systems adapted for use in fighting forest fires, altho it is, of course, to be understood that without material modification, various features of the invention are applicable to other purposes and uses.

One of the objects of the present invention is to provide an improved sprinkler system which will be reliable and efficient in use and operation.

A further object is to provide an automatic cut-off valve for use in such systems, whereby one or more branch lines may be quickly attached or detached from the main line.

A further object is to provide a system of the above general character which will prevent wastage of water at all times.

A further object is to provide a system of the above general character which will enable forest fires to be more expeditiously combatted and to avoid delays and losses, especially to equipment, in shifting the attack from one point to another.

Further objects will be in part obvious and in part hereinafter pointed out in connection with the following analysis of this invention, and in connection with the accompanying sheet of drawings, wherein such parts of the complete system are shown as will be necessary to thoroughly understand the invention.

In these drawings, where corresponding parts are indicated by similar reference characters,—

Figure 1 is a semi-diagrammatic view showing the complete system.

Figure 2 is an enlarged detail view partly in section showing the valve arrangements.

Figure 3 is a detail end view of a portion of the hose or nozzle connection.

Referring to these drawings in detail, 5 indicates diagrammatically a pump or other suitable source of water under pressure; 6 are the main hose line sections extending therefrom, while 7 indicates branch lines or hose connections applied as and when desired. These branch members 7 are provided with nozzles or other sprinkling devices, as desired.

The connections for the main line sections 6 and branch connections 7 are shown in detail in Figure 2. The end of each branch line 7 is fixed about a connecting sleeve 7' having a beveled flanged end 8 adapted to coact with and be engaged by a rotatable collar 10 provided with pins 11 to be engaged by a wrench or other suitable turning tool. The collar 10 is threaded on its inner periphery as indicated at 12 to coact with the threaded end 13 of the extension member 14. This extension member is threaded at its opposite end as indicated for connection with one of the threaded openings of the valve bonnet 15 as indicated at 16. It will be understood that in place of the single branch line connection and valve arrangement to each bonnet, the bonnet may provide connections to a plurality of branch lines as by a two or three-way valve connection. The valve member 14 is provided with a contracted portion forming a valve seat 17 adapted to be engaged by a ball valve 18. I prefer to use a ball valve as the same is less expensive to manufacture and install, and is also less likely to get out of order. After the ball valve is inserted within the sleeve, holding means such as pin 20 prevents removal or displacement.

By reference to Figure 3, it will be seen that the end of the sleeve 7' is provided with a spider 21 having a central projection 22 adapted to engage the ball valve 18 when the attaching member 10 is screwed down upon the threaded end 13; that is, the projection or pin 22 engages the ball and forces the same upwardly towards the transverse pin 20, thus allowing the water delivered to the bonnet from the line 6 to immediately pass the valve and flow to the respective lines. When the sleeve 7' is detached, the reverse operation takes place, and the ball valve 18 automatically seats itself under pipe line pressure before complete disconnection, thereby eliminating any wastage of water. This is frequently of the utmost importance in dry timberland where water is especially valuable in quenching forest fires.

In systems heretofore in use, it has been necessary to either stop the pump or shut off the main line prior to attaching or detaching line sections, and the present system overcomes this objection without waste.

Also, in systems heretofore in use, much hose was lost because of fire breaking out along the main line, and having no water available, for with the old system it was only possible to have one nozzle available on the line regardless of its length, and great difficulty was experienced in working the hose among the trees. With the present system, this danger is eliminated and a flexible line of the character described, once laid, and having any desired number of branch connections along the main line, remains safe under all circumstances.

It will be noted that, by reference to Figs. 1 and 2, the completed system provides a plurality of bonnets 15 to be attached to the respective ends of the sections 6. These bonnets 15 are threaded at their inlet and discharge sides to receive nipple 19 to which is secured the end of each section and held thereto by a clamping member 26. These sections 6 are each provided with a return check valve of any desired type adapted to prevent back flow from the system and preferably arranged at the inlet sides of the bonnets 15. These check valves, as herein shown, are mounted in the inlet sleeve 19 threaded into the bonnet 15 and provided with an apertured valve ring 23 having a valve seat therein for a valve 24 enclosed within a suitable cage 25. As stated above, the clamping member 26 connects the sleeve 19 with the hose sections 6, the parts being so positioned, assembled and arranged as to prevent a back flow from the sections 6 out thru any of the hose lines 7 when an additional pump or pumps are inserted along the line. By means of this construction, the entire system is kept filled with water, and when a branch hose 7 is applied to one of the bonnets 15 along the line, water is immediately obtainable as soon as the connection is made. The check valve, of course, can be placed at either end of each section 6 or omitted entirely where the possibility of back pressure being developed is slight.

Thus the present invention provides a simple and practical system and an automatic cut-off valve particularly adapted for use in fighting forest fires. The valve may be inexpensively manufactured and assembled and is well adapted to accomplish, among others, all of the objects and advantages herein set forth.

I claim:

1. In a sprinkler system for fighting forest fires, in combination, a main line adapted to be connected with a source of water under pressure, and comprising a plurality of line sections and valve bonnets intermediate said sections and coupled therewith, each bonnet being provided with extensions, a valve seat arranged in one extension, a ball valve adapted to coact with said valve seat, the main line sections being connected to other extensions of each bonnet, branch lines connected to said first extensions, and means to open a branch line to the main line comprising a spider carried at the end of the branch line, said spider having a projection adapted to pass into said extension operative to unseat the ball valve.

2. In a sprinkler system for fighting forest fires, in combination, a main line adapted to be connected with a source of water under pressure, and comprising a plurality of line sections and valve bonnets intermediate said sections and coupled therewith, each bonnet being provided with extensions, a valve seat arranged in one extension, a ball valve adapted to coact with said valve seat, the main line sections being connected to other extensions of each bonnet, branch lines connected to said first extensions, means carried by each branch line adapted to open said ball valve upon attachment to said first extension, and a check valve arranged in each of said bonnets, whereby a back flow of water thru the branch lines is prevented.

3. In a sprinkler system for fighting forest fires, in combination, a main line adapted to be connected with a source of water under pressure, and comprising a plurality of line sections and valve bonnets intermediate said sections and coupled therewith, each bonnet being provided with extensions, a valve seat arranged in one extension, a ball valve adapted to coact with said valve seat, the main line sections being connected to other extensions of each bonnet, branch lines connected to said first extensions, and means carried by each branch line adapted to open said ball valve upon attachment to said first extension, said means comprising a spider carried at the ends of the branch line, said spider having a projection adapted to pass into said extension thereby to unseat the ball valve, and a check valve arranged in each of said bonnets whereby a back flow of the water thru the branch line is prevented.

Signed at Belton, Montana, this 1st day of September, 1926.

PAUL SCHOENBERGER.